United States Patent
York et al.

(10) Patent No.: US 11,709,136 B2
(45) Date of Patent: Jul. 25, 2023

(54) SYSTEM AND METHOD FOR INFERRING PROTEIN BINDING

(71) Applicant: CALICO LIFE SCIENCES LLC, South San Francisco, CA (US)

(72) Inventors: Andrew Gregory York, San Francisco, CA (US); Maria Del Mar Ingaramo, San Francisco, CA (US)

(73) Assignee: CALICO LIFE SCIENCES LLC, South San Francisco, CA (US)

( * ) Notice: Subject to any disclaimer, the term of this patent is extended or adjusted under 35 U.S.C. 154(b) by 0 days.

(21) Appl. No.: 17/253,444

(22) PCT Filed: Jun. 17, 2019

(86) PCT No.: PCT/US2019/037433
§ 371 (c)(1),
(2) Date: Dec. 17, 2020

(87) PCT Pub. No.: WO2019/245946
PCT Pub. Date: Dec. 26, 2019

(65) Prior Publication Data
US 2021/0247315 A1    Aug. 12, 2021

Related U.S. Application Data

(60) Provisional application No. 62/686,279, filed on Jun. 18, 2018.

(51) Int. Cl.
*G01N 21/64* (2006.01)

(52) U.S. Cl.
CPC ..... *G01N 21/6408* (2013.01); *G01N 21/6445* (2013.01)

(58) Field of Classification Search
CPC .............. G01N 21/6408; G01N 21/6445
See application file for complete search history.

(56) References Cited

U.S. PATENT DOCUMENTS

| 6,284,544 B1 * | 9/2001 | Thompson | G01N 33/582 436/83 |
| 6,603,546 B1 * | 8/2003 | Barbieri | G01N 21/6452 356/417 |

(Continued)

OTHER PUBLICATIONS

Gaab et al., Nonstationary Rotational Diffusion in Room Temperature Liquids Measured by Femtosecond Three-Pulse Transient Anisotropy, The American Physical Society, vol. 93, No. 5, Jul. 30, 2004, 1-4 (Year: 2004).*

(Continued)

*Primary Examiner* — David P Porta
*Assistant Examiner* — Djura Malevic
(74) *Attorney, Agent, or Firm* — Lando & Anastasi, LLP

(57) ABSTRACT

Methods and apparatus for inferring protein binding based on rotational diffusion of a collection of fluorophores. One example of a method includes applying a first light pulse to excite a plurality of fluorophores in the collection of fluorophores to produce a plurality of excited fluorophores, the first light pulse having a first polarization and the plurality of excited fluorophores having a component of their orientation aligned with the first polarization, applying a second light pulse to stimulate emission by the plurality of excited fluorophores, the second light pulse having a second polarization orthogonal to the first polarization, after a time delay following application of the second light pulse, applying a third light pulse of the second polarization to further stimulate emission by the plurality of excited fluorophores, detecting polarized emissions from the plurality of excited fluorophores, and inferring the rate of rotational diffusion of the collection of fluorophores based on the detected polarized emissions.

15 Claims, 15 Drawing Sheets

(56) References Cited

U.S. PATENT DOCUMENTS

| | | | | |
|---|---|---|---|---|
| 7,456,954 | B2* | 11/2008 | Weiss | G01N 21/6445 |
| | | | | 356/417 |
| 7,842,491 | B2* | 11/2010 | Thompson | G01N 21/6445 |
| | | | | 435/232 |
| 8,063,386 | B2* | 11/2011 | Yekta | G01N 21/6458 |
| | | | | 250/459.1 |
| 8,309,346 | B2* | 11/2012 | Zuckerman | A61B 5/4842 |
| | | | | 356/369 |
| 8,948,539 | B2* | 2/2015 | Meyers | G06K 9/40 |
| | | | | 382/275 |
| 10,119,912 | B2* | 11/2018 | Mattioli Della Rocca | |
| | | | | G01N 21/6456 |
| 10,386,300 | B2* | 8/2019 | Wu | G01N 21/6408 |
| 2002/0055091 | A1* | 5/2002 | Thompson | G01N 33/542 |
| | | | | 436/83 |
| 2003/0206297 | A1* | 11/2003 | Barbieri | G01N 21/6408 |
| | | | | 356/417 |
| 2005/0064485 | A1* | 3/2005 | Vogel | G01N 33/582 |
| | | | | 435/6.11 |
| 2005/0094147 | A1* | 5/2005 | Yaroslavsky | A61B 5/444 |
| | | | | 356/417 |
| 2005/0250170 | A1* | 11/2005 | Thompson | G01N 21/6445 |
| | | | | 435/196 |
| 2007/0109536 | A1* | 5/2007 | Weiss | G01J 3/4338 |
| | | | | 356/318 |
| 2010/0090127 | A1* | 4/2010 | Yekta | G01N 21/6458 |
| | | | | 250/459.1 |
| 2012/0018651 | A1* | 1/2012 | Hess | G02B 21/0088 |
| | | | | 359/385 |
| 2016/0170199 | A1* | 6/2016 | Inoue | H04N 9/3158 |
| | | | | 353/31 |
| 2017/0045521 | A1* | 2/2017 | Vinegoni | G02B 21/0096 |
| 2017/0176334 | A1* | 6/2017 | Mattioli Della Rocca | |
| | | | | G01N 21/21 |
| 2017/0176338 | A1* | 6/2017 | Wu | G02B 21/367 |
| 2018/0080875 | A1* | 3/2018 | Mattioli Della Rocca | |
| | | | | G01N 21/6428 |
| 2023/0073324 | A1* | 3/2023 | Lew | G01N 21/6458 |

OTHER PUBLICATIONS

Kevin M. Gaab et al., "Nonstationary Rotational Diffusion in Room Temperature Liquids Measured by Femtosecond Three-Pulse Transient Anisotropy", Physical Review Letters, vol. 93, No. 5 (Jul. 2004); XP055614418, ISSN:0031-9007, DOI: 10.1103/PhysRevLett.93.056001.

Christoph M. Pieper et al., "Fluorescence correlation spectroscopy as a tool for measuring the rotational diffusion of macromolecules", Chemical Physics Letters, vol. 516, No. 1, pp. 1-11; XP028332451, ISSN: 0009-2614, DOI: 10.1016/J.CPLETT.2011.06.091 (retrieved Jul. 7, 2011).

Anastasia Loman et al., "Measuring rotational diffusion of macromolecules by fluorescence correlation spectroscopy", Photochemical & Photobiological Sciences, vol. 9, No. 5, pp. 627-636 (Jan. 2010); XP055614416, GB, ISSN: 1474-905X, DOI: 10.1039/B9PP00029A.

* cited by examiner

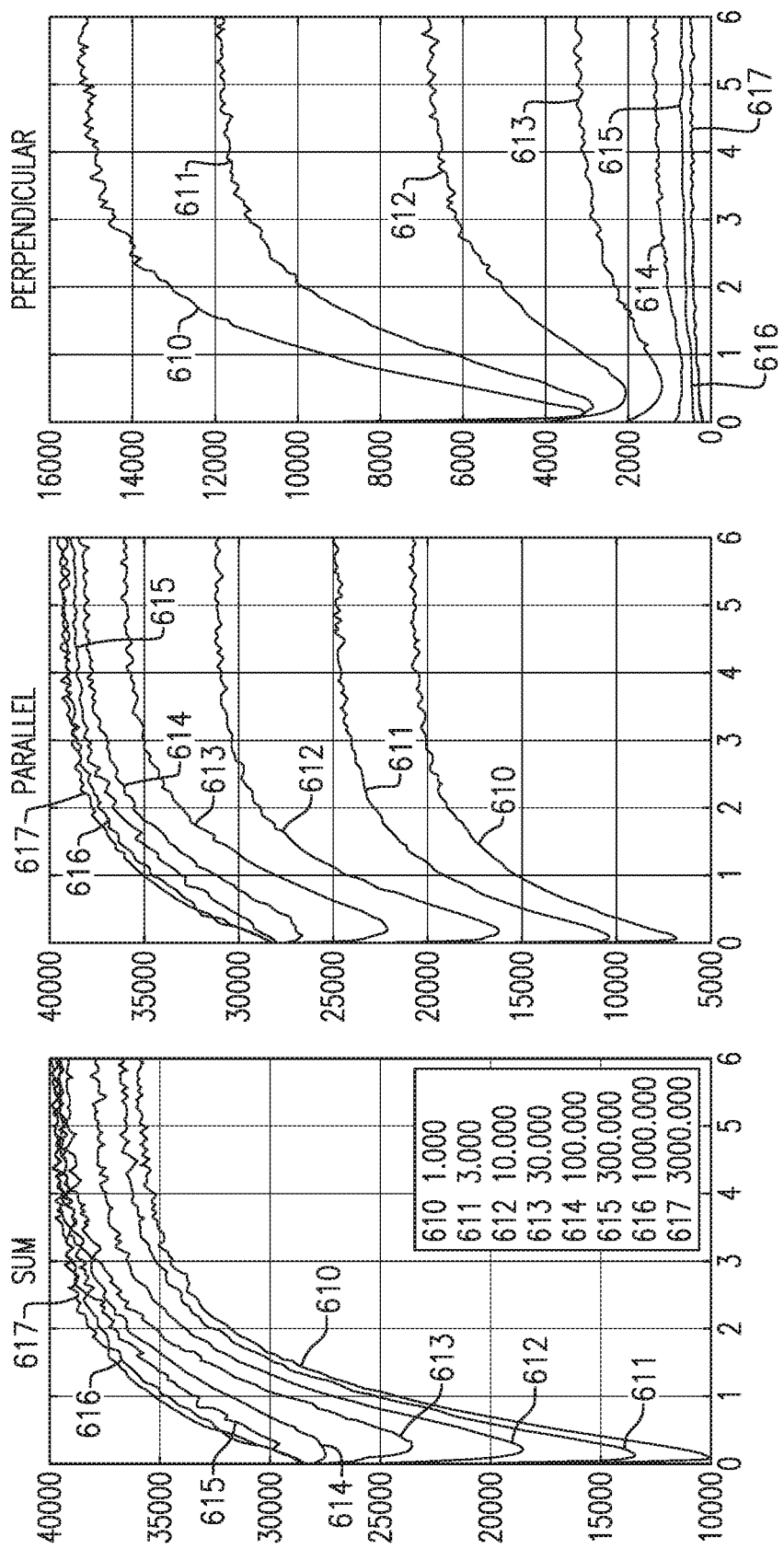

SYSTEM AND METHOD FOR INFERRING PROTEIN BINDING

CROSS-REFERENCE TO RELATED APPLICATIONS

This application is a U.S. national phase application and claims the benefit of priority under 35 U.S.C. § 371 of International (PCT) Patent Application No. PCT/US2019/037433, filed on Jun. 17, 2019 and titled "SYSTEM AND METHOD FOR INFERRING PROTEIN BINDING" which, in turn, claims the benefits under 35 U.S.C. § 119(e) and PCT Article 8 of U.S. Provisional Patent Application No. 62/686,279, filed on Jun. 18, 2018 and titled "SYSTEM AND METHOD FOR INFERRING PROTEIN BINDING," the contents of which are incorporated herein by reference in their entireties.

BACKGROUND

Proteins in solution "tumble" (change orientation) stochastically. The rate of tumbling is approximately proportional to the mass of the protein. Thus, when a protein binds to or unbinds from some other macromolecule, its rate of tumbling changes. This means that in certain circumstances, protein binding dynamics may be inferred from accurate measurement of tumbling rates.

Fluorescent molecules (fluorophores) emit polarized light, with the polarization direction determined by the fluorophore orientation. Similarly, fluorophores can be excited with laser light, and the probability of excitation depends on the polarization direction of the laser light and the orientation of the fluorophore. When the polarization of the excitation beam corresponds to the fluorophore orientation, there is an efficient transfer of energy from the laser beam to the fluorophore and the fluorophore has a high probability of being excited. In contrast, when the polarization of the excitation beam is perpendicular to the fluorophore orientation, there is a very low probability that the fluorophore will be excited. Fluorescent emissions from excited fluorophores can be measured using a photosensitive detector. Accordingly, by accurately controlling which fluorophore orientations are excited, and accurately measuring the polarization of fluorescent emission, fluorophore orientation can be inferred. Further, fluorophore tumbling rates can be inferred from measuring the dynamics of the fluorophore orientation. Thus, if the fluorophores are attached to proteins of interest, protein binding dynamics can be inferred.

Conventionally, time-resolved fluorescent anisotropy decay is used to determine tumbling rate via fluorophore polarization. This method involves measuring an ensemble average (group of the same molecules) of tumbling based on polarization-controlled fluorescent emission, as discussed above. FIG. 1 is a flow diagram illustrating an example of a process of time-resolved fluorescent anisotropy decay used to measure rate of tumbling. The process 100 begins at step 110 with an initial collection of fluorophores. A representation of the initial collection of fluorophores in shown in FIG. 2A. Each "dot" on the sphere 200 represents an individual fluorophore 210. The position of each fluorophore 210 on the sphere 200 represents the orientation (or "pointing direction") of the fluorophore in three-dimensional (x, y, z) space. In the initial collection of fluorophores, the fluorophores have an initial thermal distribution and the orientation of any given fluorophore is random. Accordingly, as shown in FIG. 2A, the fluorophores 210 are distributed over substantially the entire sphere 200. If no particular action is taken, the fluorophores will randomly "walk" on the sphere 200 as their orientation randomly changes over time. This process is referred to as rotational diffusion or "tumbling". As discussed above, for a given temperature and other environmental conditions of the collection of fluorophores, the rate of tumbling or rotational diffusion depends on the size/mass of the fluorophore. The larger the fluorophore, the slower the rate of tumbling.

Referring again to FIG. 1, at step 120, a pulse of polarized light is applied to the initial collection of fluorophores to selectively excite those fluorophores that have a component of their orientation in the same direction as the polarization of the applied light pulse. For example, a pulse of light polarized in the x-direction selectively excites fluorophores 210x having a component of their orientation in the x-direction. An example of the resulting distribution of fluorophores 210x following application of a pulse of light polarized in the x-direction is shown in FIG. 2B.

Over time, the excited fluorophores will decay back to their unexcited state and emit light during the state transition, a process known as spontaneous emission. The emission is polarized based on the orientation of the fluorophore at the time it emits the light. FIG. 2C illustrates a distribution of detected x-polarized emissions 220 and y-polarized emissions 230 from the collection of fluorophores of FIGS. 2A and 2B. The excited fluorophores change orientation over time by rotational diffusion, and therefore the polarization of the emissions is determined based on both the rate of rotational diffusion and the rate of spontaneous emission. For example, if the rate of rotational diffusion is relatively slow, and the rate of spontaneous emission is relatively fast, the excited fluorophores will not have time to change their orientation before spontaneous emission occurs, and the emissions will be predominantly polarized along the same direction as the excitation beam. Faster rotational diffusion means that more fluorophores are able to change their orientation prior to the occurrence of spontaneous emission. Accordingly, time-resolved detection of the resulting x-polarized and y-polarized emission (step 130) yields a pair of curves, which can be analyzed to infer tumbling rates (step 140).

FIGS. 3A and 3B are graphs showing a family of simulated measurement curves. FIG. 3A shows plots of parallel emission polarization (e.g., x-polarized emission for an x-polarized excitation) as a function of time, and FIG. 3B shows corresponding plots of perpendicular emission polarization (e.g., y-polarized emission for an x-polarized excitation) as a function of time. The scale on the vertical axis is measured in "counts" on a photosensitive detector, which is generally proportional to the number of molecules, the brightness of the excitation light, and the efficiency of the detection. Each pair of curves (in FIG. 3A and FIG. 3B) corresponds to a different protein mass, and therefore a different tumbling rate. The protein mass is represented by the ratio of rotational diffusion time to the fluorescent lifetime (i.e., unitless). For example, a mass of 10 corresponds to the case in which the rotational diffusion time is 10 times longer than the fluorescent lifetime of the molecule. The fluorescent lifetime refers to the average time that the molecule remains in the excited state before emitting a photon. The rotational diffusion time is the time taken for the molecule to rotate one radian.

SUMMARY OF INVENTION

Aspects and embodiments are directed to an improved method to infer protein binding in vivo, via optical measurements of the orientation of fluorescent tags attached to these proteins, enhanced by either saturated polarized stimulated emission or saturated polarized photoactivation.

According to one embodiment, a method of inferring a rate of rotational diffusion of a collection of fluorophores comprises applying a first pulse of light to the collection of fluorophores to excite a plurality of fluorophores in the collection of fluorophores to produce a plurality of excited fluorophores, the first pulse of light having a first polarization and the plurality of excited fluorophores having a component of their orientation aligned with the first polarization, applying a second pulse of light to the collection of fluorophores to stimulate emission by the plurality of excited fluorophores, the second pulse of light having a second polarization orthogonal to the first polarization, and applying a third pulse of light to the collection of fluorophores to further stimulate emission by the plurality of excited fluorophores, the third pulse of light having the second polarization and being applied after a predetermined time delay following application of the second pulse of light. The method further comprises detecting polarized emissions from the plurality of excited fluorophores, and inferring the rate of rotational diffusion of the collection of fluorophores based on the detected polarized emissions. Detecting the polarized emissions from the plurality of excited fluorophores may be performed before and/or after the application of the third pulse of light.

In one example the first polarization is in the x-direction and the second polarization is in the y-direction. In another example detecting the polarized emissions includes receiving the polarized emissions at a photosensitive detector.

According to another embodiment a method of inferring protein binding comprises applying an excitation pulse of light to a sample including proteins of interest and a collection of fluorophores to excite a plurality of fluorophores in the collection of fluorophores to produce a plurality of excited fluorophores, the excitation pulse having a first polarization and the plurality of excited fluorophores having a first component of their orientation aligned with the first polarization, applying a depletion pulse of light to the sample to deplete a first portion of the plurality of excited fluorophores, the depletion light pulse having a second polarization orthogonal to the first polarization and the first portion of the plurality of excited fluorophores having a second component of their orientation aligned with the second polarization, and applying a probe pulse of light to the sample, the probe pulse of light having the second polarization and being applied after a predetermined time delay following application of the depletion pulse of light. The method further comprises detecting polarized emissions from the plurality of excited fluorophores, inferring an estimated tumbling rate of the collection of fluorophores based on the detected polarized emissions, and based on the estimated tumbling rate, inferring a degree of protein binding in the sample. Detection of the polarized emissions may be performed before and/or after application of the probe pulse of light.

In one example the first polarization is in the x-direction and the second polarization is in the y-direction. In another example detecting the polarized emissions includes receiving the polarized emissions at a photosensitive detector. The method may further comprise varying the predetermined time delay.

In certain examples of the method, applying the probe pulse of light to the sample includes applying a first probe pulse of light having the first polarization and applying a second probe pulse of light having the second polarization, the first probe pulse being applied between application of the depletion light pulse and the second probe pulse.

Another embodiment is directed to a system for measuring rotational diffusion of a collection of fluorophores. The system comprises a sample chamber configured to hold the collection of fluorophores, and a light source apparatus configured to produce a first pulse of light having a first polarization, a second pulse of light having a second polarization, and a third pulse of light having the second polarization, the first and second polarizations being orthogonal to one another, and the second and third pulses of light being temporally separated from one another by a predetermined time delay, the light source apparatus being further configured to direct the first, second, and third light pulses to the sample chamber. The system further comprises a detector configured to receive polarized emissions from the collection of fluorophores, the collection of fluorophores emitting the polarized emissions in response to being illuminated by one of the first, second, and third pulses of light, the detector being further configured to provide an output representative of the detected polarized emissions, and a controller coupled to the detector and configured to receive the output from the detector and to determine an estimated rate of rotational diffusion of the collection of fluorophores based on the output received from the detector.

In one example the system further comprises optics disposed between the sample chamber and the detector and configured to direct the polarized emissions to the detector. In another example the light source apparatus includes a first light source configured to produce the first pulse of light and a second light source configured to produce the second and third pulses of light. In one example the first pulse of light is x-polarized and the second and third pulses of light are y-polarized. In one example the first and second light sources are lasers. The controller may be further configured to display an indication of the estimated rate of rotational diffusion of the collection of fluorophores. In one example the sample chamber holds a collection of proteins of interest in addition to the collection of fluorophores, and the controller is further configured to infer a degree of protein binding between the collection of proteins and the collection of fluorophores based in part on the estimated rate of rotational diffusion of the collection of fluorophores. In another example, individual fluorophores of the collection of fluorophores are bound to individual carrier proteins of a corresponding collection of the carrier proteins, the sample chamber further holds a collection of proteins of interest, and the controller is further configured to infer a degree of protein binding between the collection of proteins of interest and the collection of carrier proteins based in part on the estimated rate of rotational diffusion of the collection of fluorophores.

Another embodiment is directed to a method of inferring a rate of rotational diffusion of a collection of fluorophores using photoactivation and deactivation. The method comprises applying a first pulse of light to the collection of fluorophores to photoactivate a plurality of fluorophores in the collection of fluorophores to produce a plurality of activated fluorophores, the first pulse of light having a first polarization and the plurality of activated fluorophores having a component of their orientation aligned with the first polarization, applying a second pulse of light to the collection of fluorophores to deactivate at least some of the plurality of activated fluorophores, the second pulse of light having a second polarization orthogonal to the first polarization, detecting polarized emissions from the plurality of activated fluorophores, and inferring the rate of rotational diffusion of the collection of fluorophores based on the detected polarized emissions.

In certain examples, the method further includes applying at least one excitation pulse of light to the collection of fluorophores after a predetermined time delay following application of the second pulse of light to produce a plurality of excited fluorophores, the at least one excitation pulse having the first polarization. Detecting the polarized emissions from the plurality of activated fluorophores includes detecting the polarized emissions from the plurality of excited fluorophores. In certain examples, the method further comprises applying at least one depletion pulse to the collection of fluorophores after application of the at least one excitation pulse. In some examples, the at least one excitation pulse includes a plurality of excitation pulses.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 6A-C are graphs showing a family of simulated measurement curves of fluorescence signal as a function of probe delay for an example of the process of FIG. 4;

DETAILED DESCRIPTION

Figure 3A:
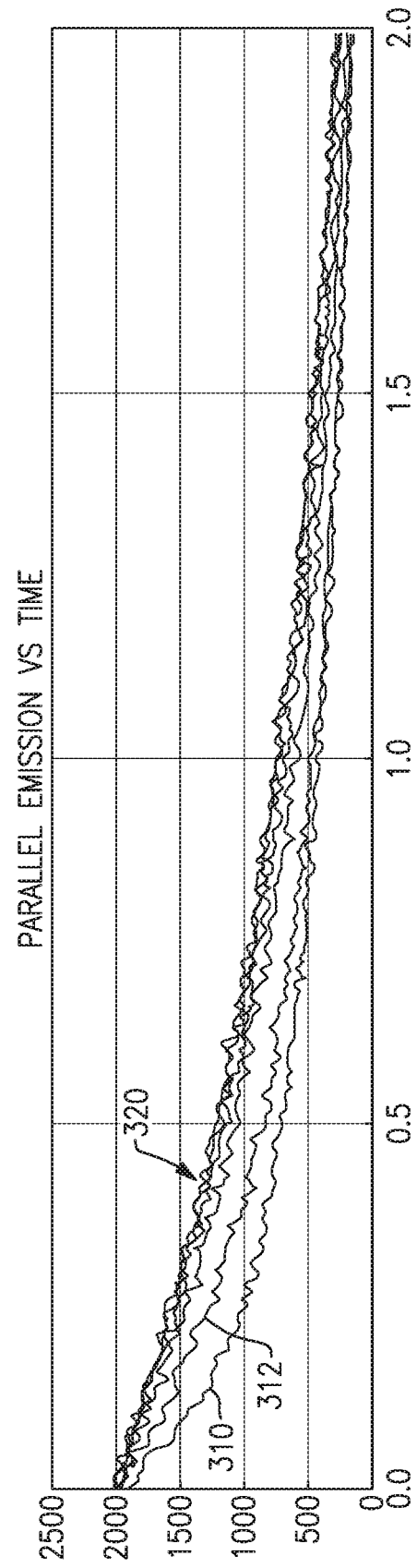
FIGS. 3A and 3B are graphs showing a family of simulated measurement curves produced from an example of the process of FIG. 1.
Figure 3B:
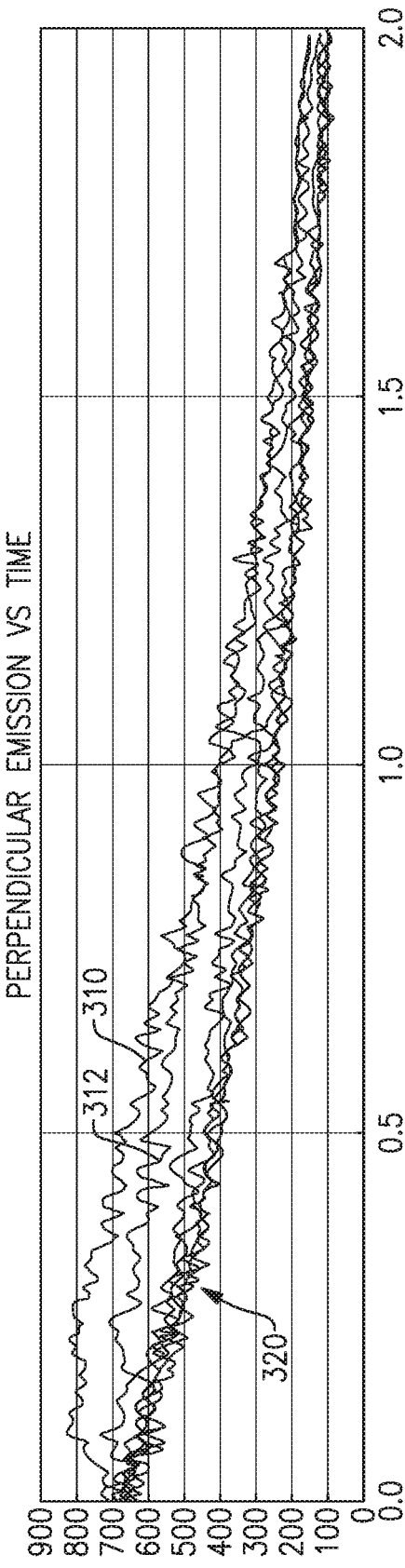

Aspects and embodiments are directed to methods and apparatus for inferring protein binding using fluorescent tags. As discussed above, time-resolved fluorescent anisotropy decay can be used to determine tumbling rates and thereby infer the mass of the associated molecules. However, the conventional method is limited in application due to an inability to distinguish tumbling rates, and therefore molecule size, above a certain threshold. For example, referring again to FIGS. 3A and 3B, curves 310 corresponding to a protein mass of 1, and curves 312 corresponding to a protein mass of 3 can be at least partially distinguished, but the remaining curves 320 representing different molecule sizes become essentially indistinguishable above a mass limit of 10. Accordingly, it becomes impractical to infer conditions such as protein binding (or lack thereof). For example, the green fluorescent protein (GFP), which is a useful fluorophore in protein binding applications, has a mass on its own (before it attaches to a protein of interest) that already approaches the mass limit for useful time-resolved fluorescent anisotropy decay analysis. Further, many proteins and protein complexes of interest have masses much greater than that of GFP. This severely limits the utility of time resolved fluorescence anisotropy decay for measuring protein binding in-vivo because the mass limit is simply too low.

Aspects and embodiments are directed to an improved method and apparatus for determining molecule mass, and from there inferring protein binding or other chemical/biological conditions, based on time-resolved measurements of polarized emissions from fluorescent tags. As discussed in more detail below, certain embodiments use saturated stimulated emission to measure fluorophore orientation and significantly increase the mass limit for inferring tumbling rates, and certain embodiments apply photoactivation and photodeactivation to extend the mass limit even further.

Figure 1:
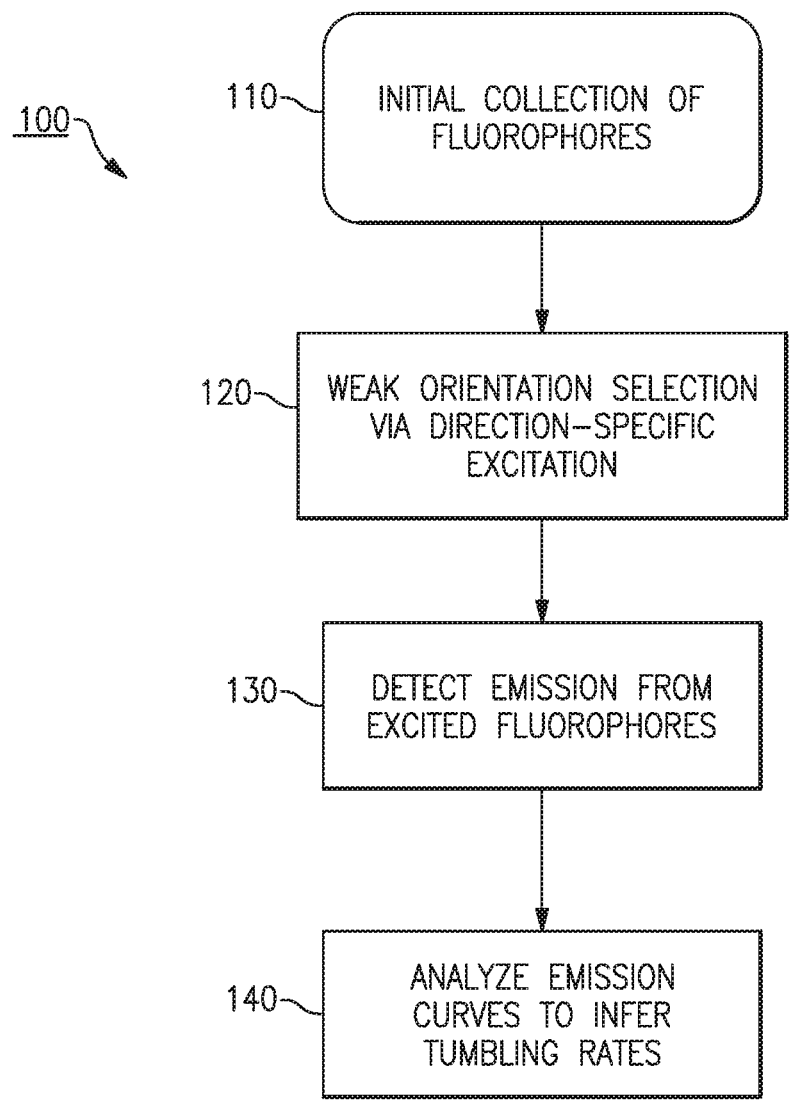
FIG. 1 is a flow diagram of an example of a process of applying time-resolved fluorescent anisotropy decay to infer a tumbling rate of a collection of fluorophores.
Figure 2A:
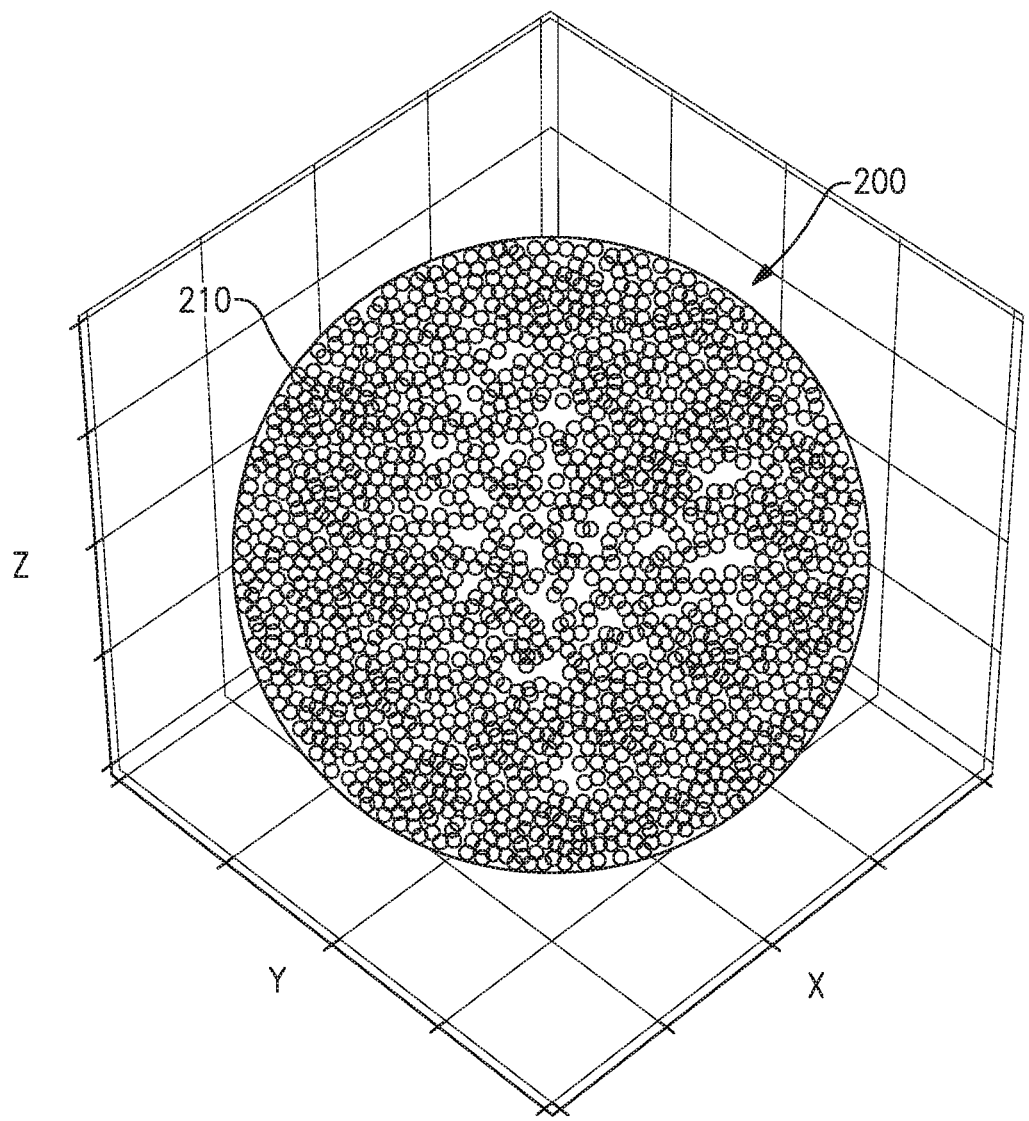
FIG. 2A is a depiction of an initial thermal distribution of the orientations of fluorophores in a collection of fluorophores.
Figure 2B:
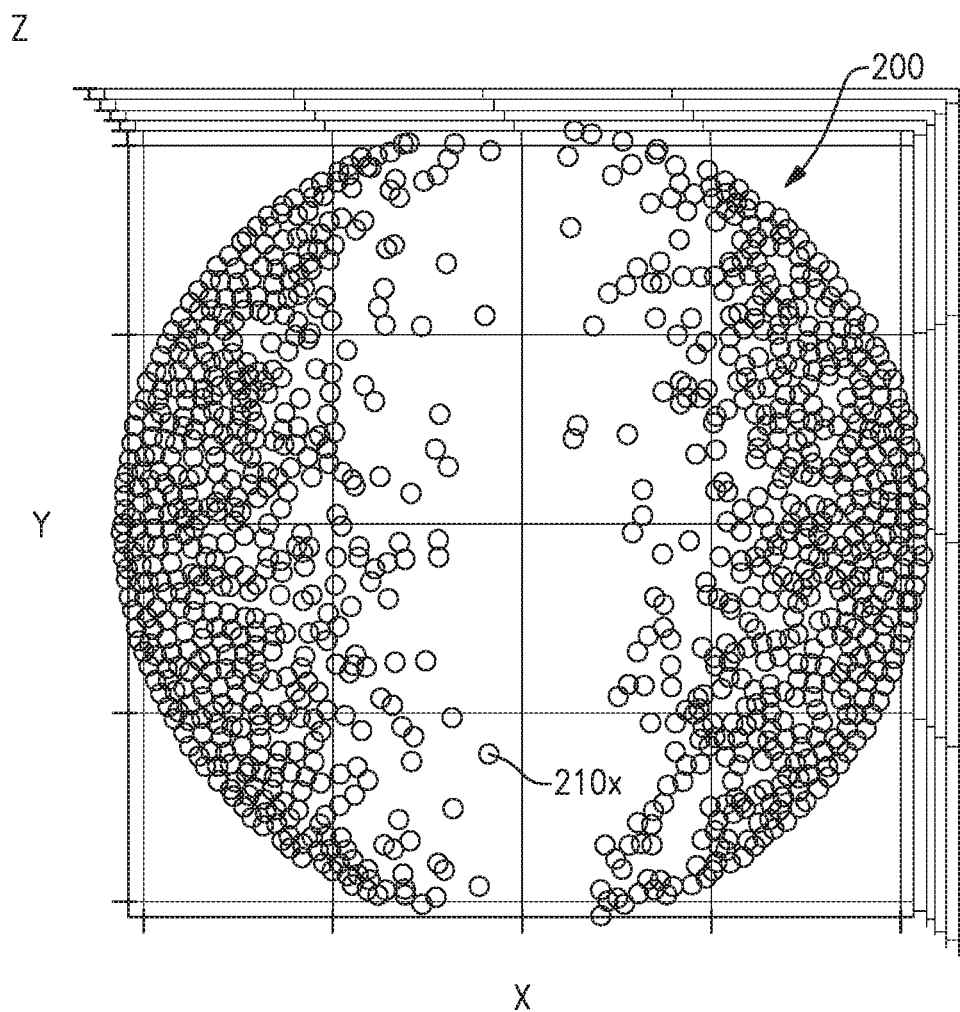
FIG. 2B is a depiction of the distribution of the orientations of the fluorophores following application of an excitation pulse in the process of FIG. 1.
Figure 2C:
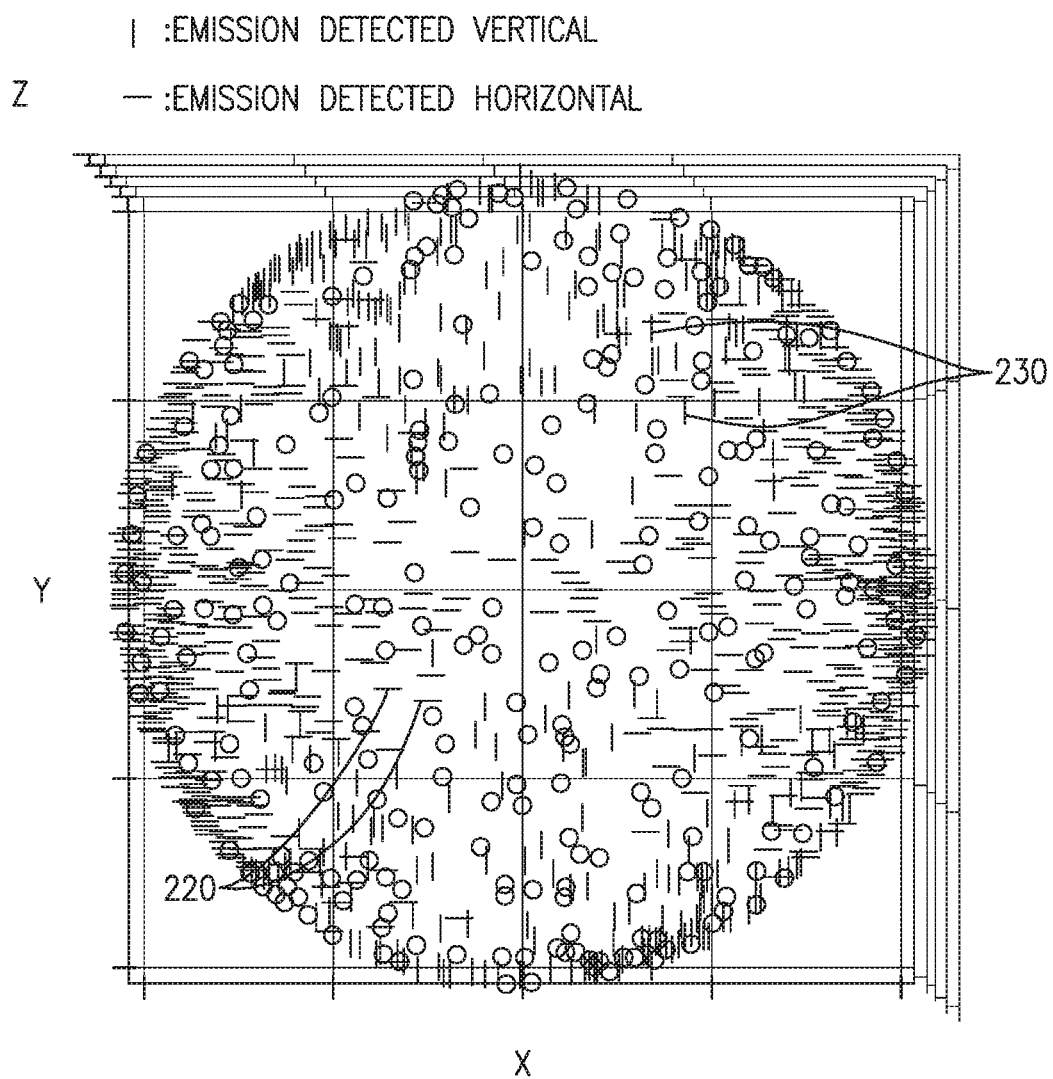
FIG. 2C is a depiction of a distribution of detected x-polarized emissions 220 and y-polarized emissions from the collection of fluorophores of FIGS. 2A and 2B.
Figure 4:
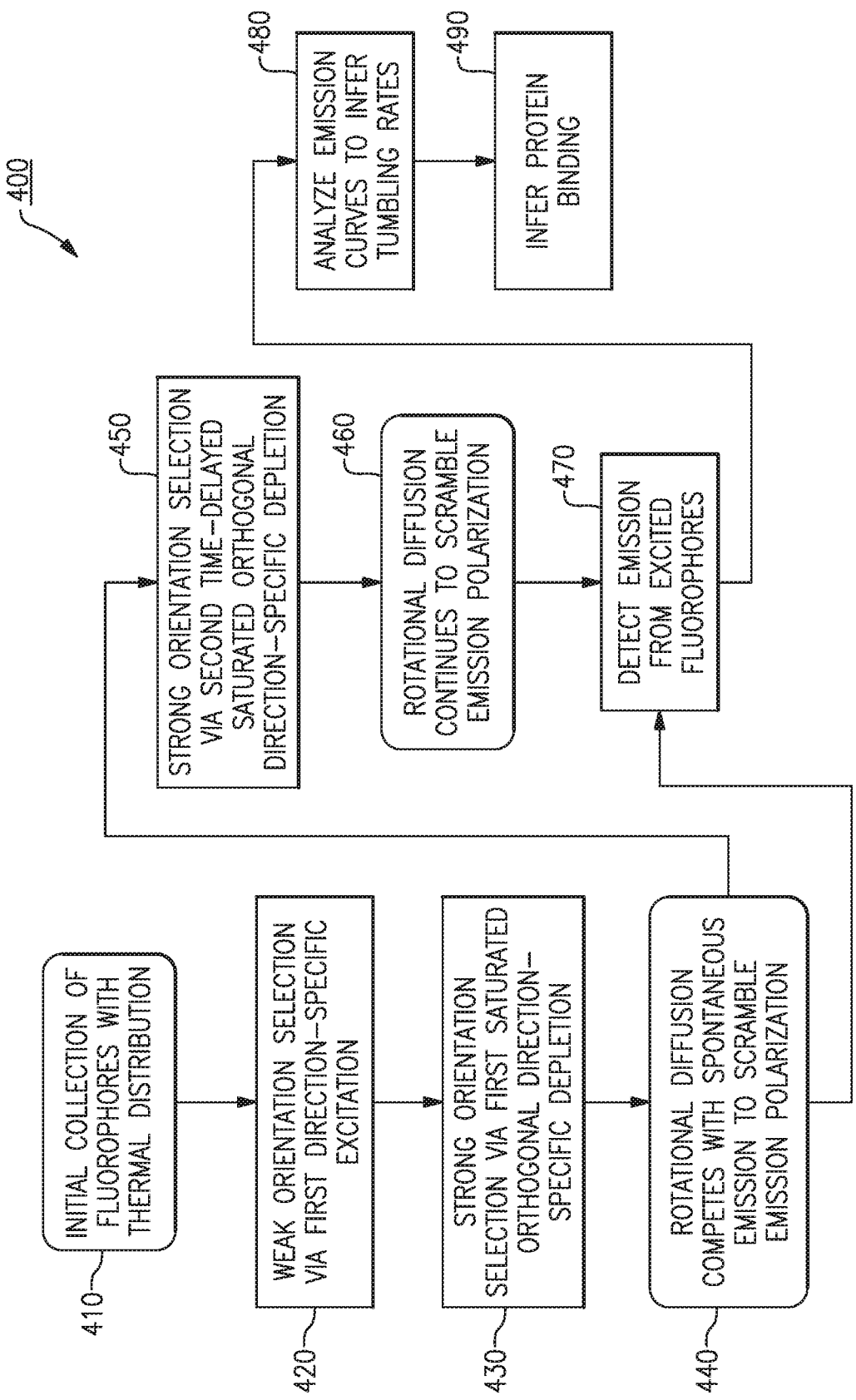
FIG. 4 is a flow diagram of an example of a process of inferring protein binding using fluorescent tags according to certain aspects disclosed herein.
Figure 5A:
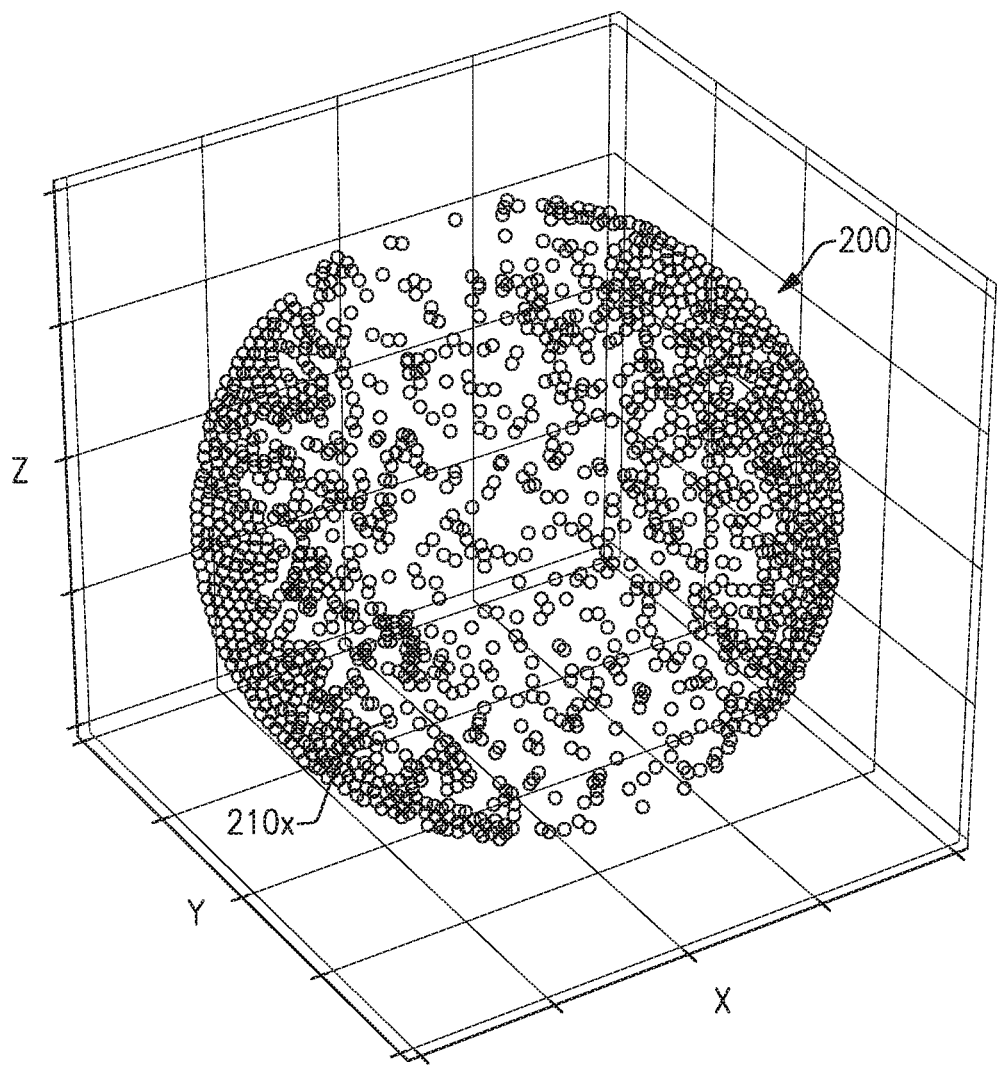
FIGS. 5A-5F are depictions of an example of the distribution of fluorophore orientations and polarized emissions from the fluorophores corresponding to steps in the process of FIG. 4.
Figure 5B:
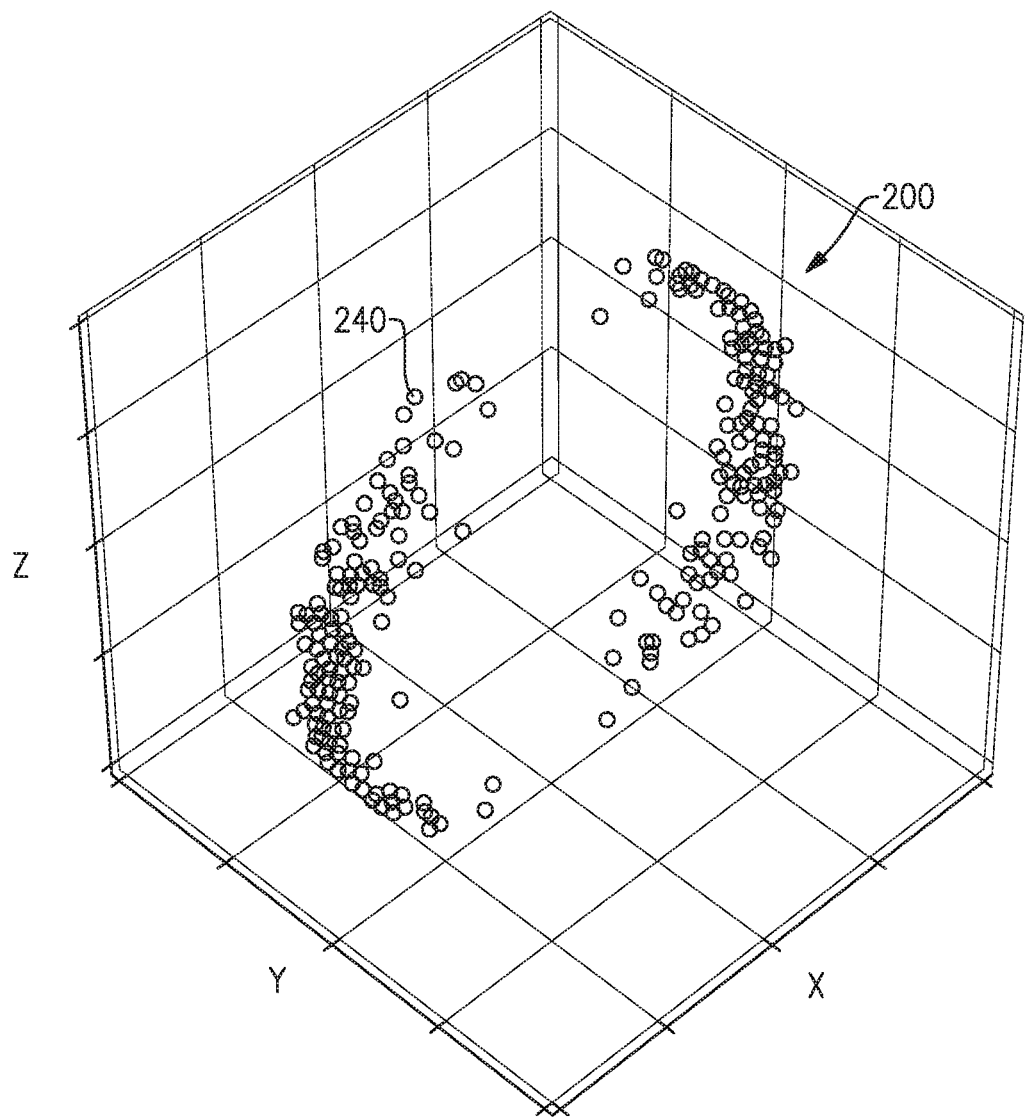

Referring to FIG. 4, there is illustrated a flow diagram of one example of a process of inferring protein binding using saturated stimulated emission anisotropy according to certain embodiments. The process 400 begins at step 410 with an initial thermal distribution of fluorophores 210, as discussed above with reference to FIG. 2A. In certain examples the fluorophores are in solution and therefore may have an isotropic initial distribution, as shown in FIG. 2A. However, in other examples, the fluorophores may be partially anchored or otherwise in a state such that their initial distribution at step 410 is not isotropic. In step 420 a first pulse of polarized light is applied to the initial collection of fluorophores to selectively excite those fluorophores that have a component of their orientation in the same direction as the polarization of the applied light pulse. For example, a pulse of light polarized in the x-direction selectively excites fluorophores $210x$ having a component of their orientation in the x-direction. An example of the resulting distribution of fluorophores $210x$ following application of a pulse of light polarized in the x-direction is shown in FIG. 5A. Following application of the first pulse of light, a second pulse of light polarized in an orthogonal direction is applied to the collection of fluorophores in step 430 and selectively depletes excited fluorophores $210x$ which have some component of the orientation in the same direction as the applied second pulse of light. FIG. 5B shows an example of the resulting distribution remaining excited fluorophores 240 following application of the second pulse of light. In this example, the second pulse of light is polarized in the y-direction. Provided that the second pulse of light is sufficiently strong (saturated), the resulting orientation distribution of excited fluorophores 240 is tightly confined to the x-z plane, as shown in FIG. 5B, which makes changes in polarization due to tumbling much easier to detect.

Figure 5C:
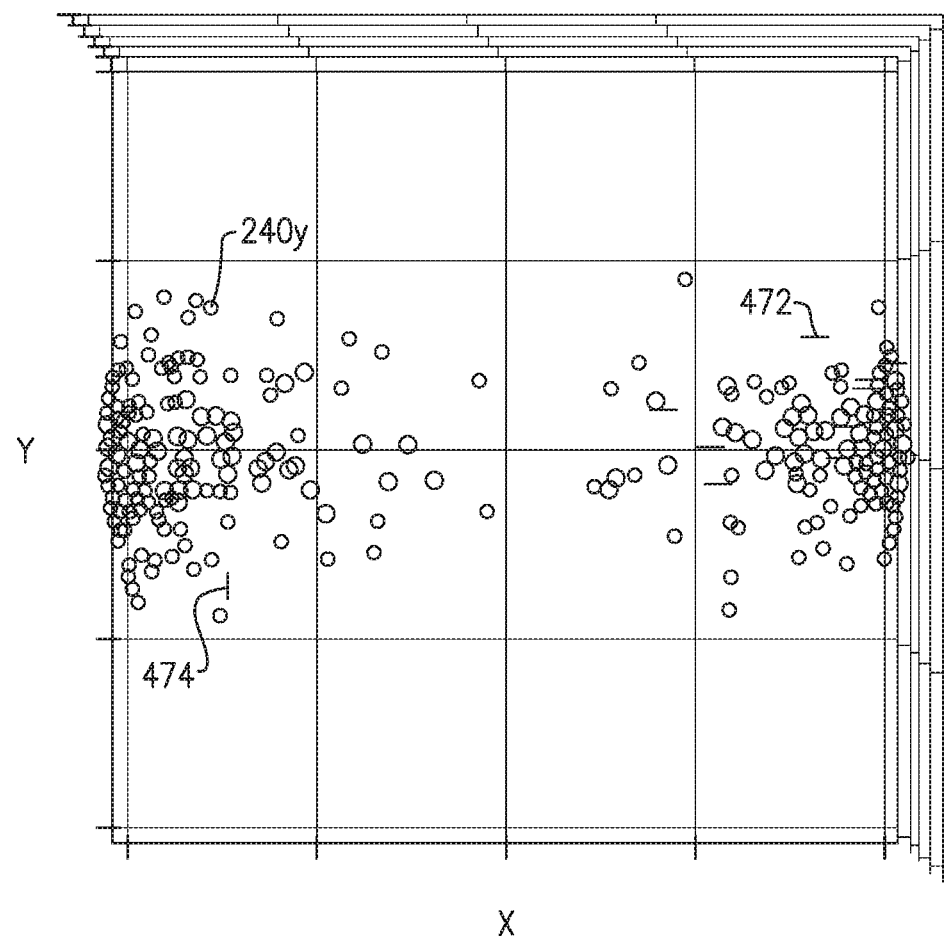
Figure 5D:
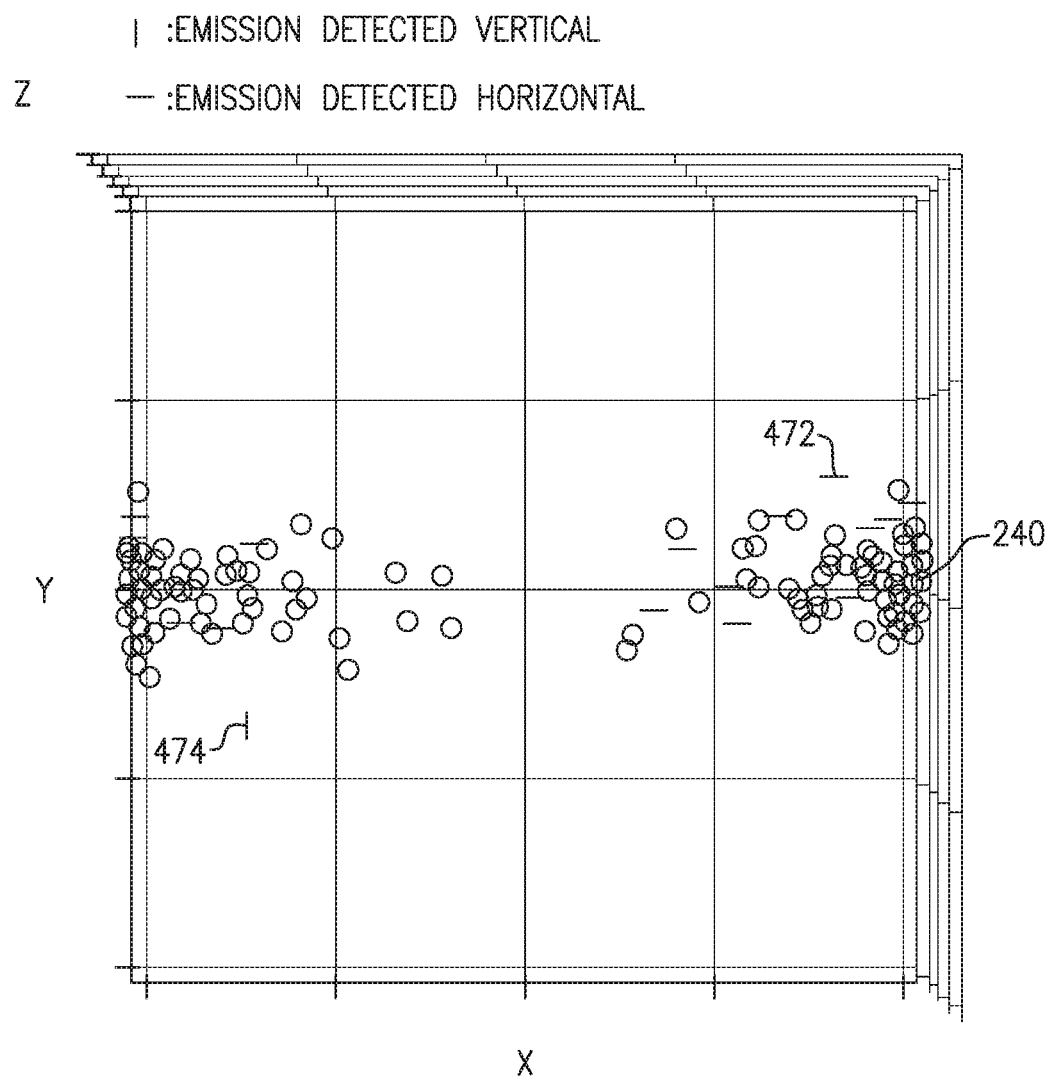
Figure 5E:
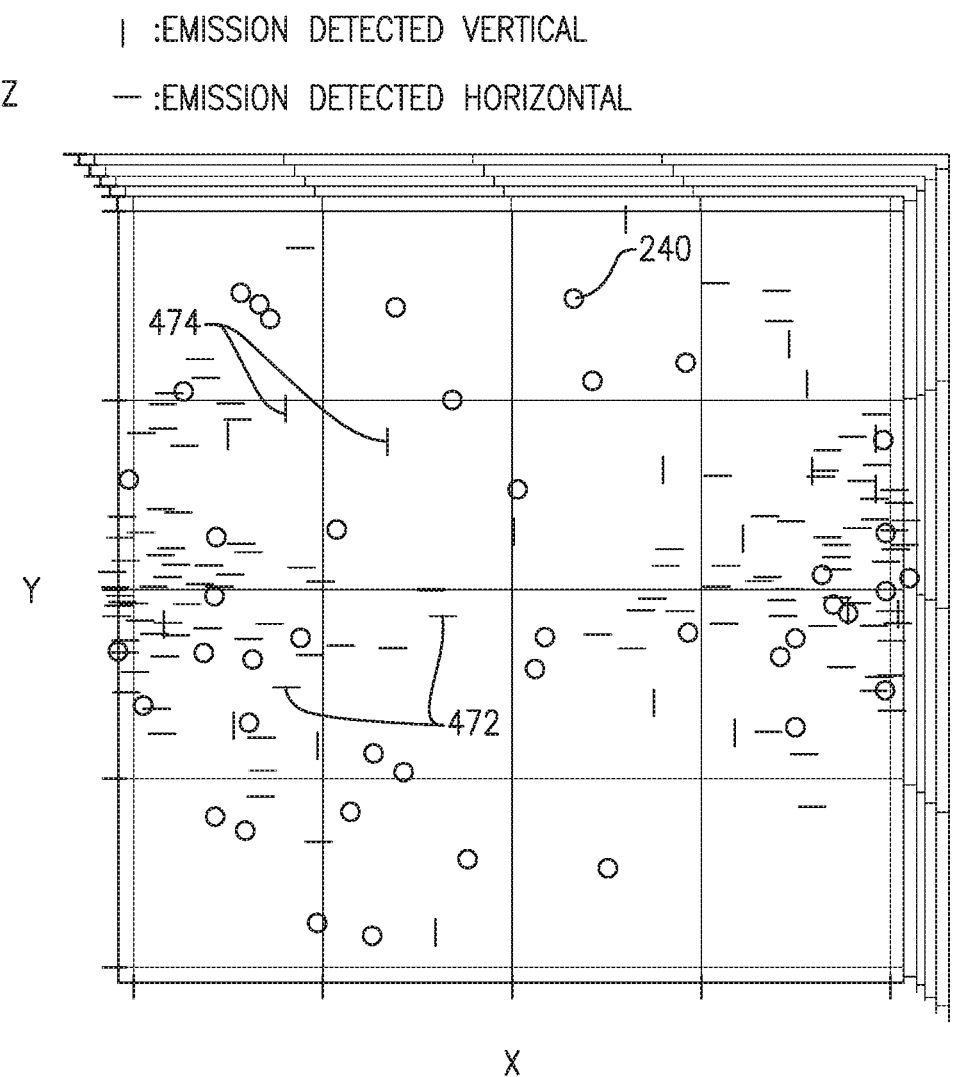

As discussed above, after a period of time, spontaneous emission causes the excited fluorophores 240 to emit light that is polarized according to the orientation of the fluorophore. Rotational diffusion (tumbling) causes the orientation of the fluorophores to change, and therefore the distribution of the fluorophores may expand off the x-z plane, as shown in FIG. 5C, and the polarization of the emissions changes as well, as indicated at block 440 in FIG. 4. Accordingly, the process 400 may include step 450 of applying a third pulse of light having the same polarization as the second pulse of light (y-polarization in the illustrated example) but delayed in time relative to the second pulse of light. This third pulse of light depletes remaining excited fluorophores 240y that, due to tumbling, have some component of their orientation in the y-direction, and causes the distribution of the excited fluorophores to be reconstrained in the x-z plane, as shown in FIG. 5D. Application of the third pulse of light allows a "pump-probe" measurement of fluorophore orientation to be made. Following application of the third pulse of light, rotational diffusion and spontaneous emission continue, as indicated at block 460 in FIG. 4 and shown in FIG. 5E.

Figure 5F:
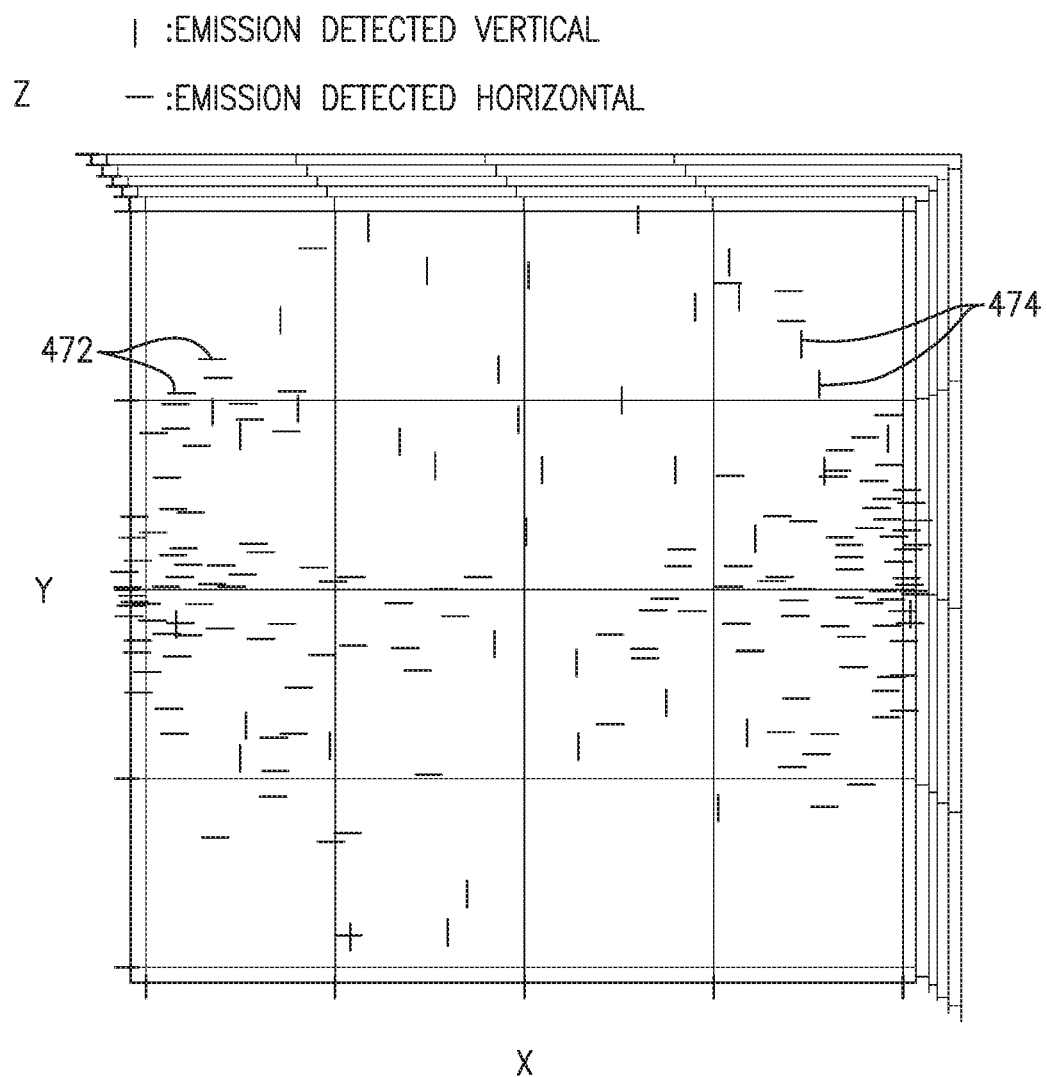

FIG. 5F illustrates a distribution of detected x-polarized emissions 472 and y-polarized emissions 474 from the collection of fluorophores of FIGS. 5A-5E, at a certain time period after application of the third pulse of light. As discussed above, the excited fluorophores change orientation over time by rotational diffusion, and therefore the polarization of the emissions is determined based on both the rate of rotational diffusion and the rate of spontaneous emission. Accordingly, time-resolved detection of the resulting x-polarized and y-polarized emissions (step 470) yields a collection of curves, an example of which is shown in FIGS. 6A-C, which can be analyzed to infer tumbling rates (step 480).

Referring to FIGS. 6A-C there is illustrated a family of simulated measurement curves of fluorescence signal as a function of probe delay (i.e., delay in application of the third pulse of light relative to application of the second pulse of light as discussed above with respect to FIG. 4) corresponding to the example shown in and discussed with reference to FIGS. 5A-F. FIG. 6B shows plots of parallel emission polarization (e.g., x-polarized emission for an x-polarized excitation), FIG. 6C shows corresponding plots of perpendicular emission polarization (e.g., y-polarized emission for an x-polarized excitation), and FIG. 6A is the sum of the parallel and perpendicular emissions. The scale on the vertical axis is measured in "counts" on a photosensitive detector, which is generally proportional to the number of molecules, the brightness of the excitation light, and the efficiency of the detection. Each group of curves, i.e., those having the same reference numeral in FIGS. 6A-C, corresponds to a different molecule mass, and therefore a different tumbling rate. As discussed above with reference to FIGS. 3A and 3B, the protein mass is represented by the ratio of rotational diffusion time to the fluorescent lifetime (i.e., unitless). As can be seen with reference to FIGS. 6B and 6C in particular, the curves corresponding to different molecules' masses can be easily distinguished from one another up to a mass limit of 300 (curves 610-615). By comparison with FIGS. 3A and 3B, it can be seen that the high-mass extreme of the distinguishable mass range is increased roughly 30-fold using a process of saturated stimulated emission anisotropy according to embodiments disclosed herein rather than the conventional approach based on time-resolved fluorescent anisotropy decay. Thus, by analyzing the emission curves to infer tumbling rates and based on a known relationship between tumbling rate and molecule mass, the molecule mass can be inferred, which in turn allows one to infer conditions, such as protein binding, for example (step 490) based on known estimates of the mass of the fluorescent tag (optionally in combination with a carrier protein) with and without a bound protein of interest. By greatly extending the mass limit, the fundamental limitations of time-resolved fluorescence anisotropy decay are overcome, providing the ability to perform optical protein binding measurements.

Figure 7:
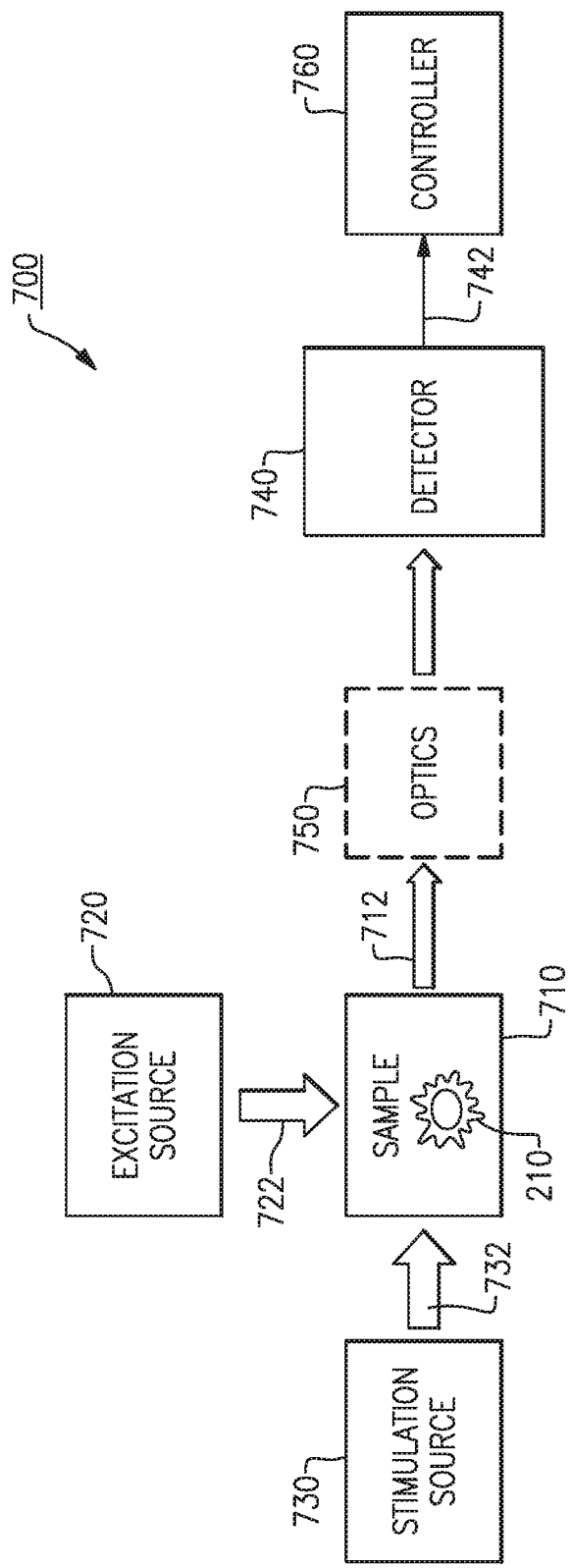
FIG. 7 is block diagram of one example of a measurement system according to aspects disclosed herein.

FIG. 7 is a block diagram of one example of a system configured to implement a molecule analysis process using saturated stimulated emission anisotropy according to certain embodiments. The system 700 includes a sample chamber 710 that contains the collection of fluorophores 210 along with other ingredients of interest. For example, for a protein binding detection application, the sample chamber 710 may contain a solution that includes the proteins of interest along with the collection of fluorophores, which may be bound to carrier proteins. The sample chamber may be an artificial chamber or a biological structure, such as one or more cells, for example. The system 700 includes an excitation source 720 that is configured to apply an excitation pulse 722 to the sample chamber 710. The excitation pulse is the first pulse of light having a first polarization (e.g., x-polarized light as in the example discussed above). In one example the excitation source is a laser; however, other light sources capable of producing polarized light pulses may be used. The system 700 further includes a stimulation source 730 configured to apply the second pulse of light (a quenching pulse) and the third pulse of light (the probe) to the sample chamber 710. The second and third light pulses are collectively represented in FIG. 7 as light beam 732 even though in practice they are temporally separated from one another. As discussed above, the stimulation source 730 is configured to produce the second and third pulses of light having a polarization orthogonal to that of the excitation pulse (e.g., y-polarized light in the example discussed above). In one example the stimulation source is a laser; however, other light sources capable of producing polarized light pulses may be used. In FIG. 7 the excitation source 720 and the stimulation source 730 are shown as separate devices; however, in other examples a single light source capable of producing orthogonally polarized light pulses may be used. For example, a laser with a configurable polarizer may be used. Further, in FIG. 7 the excitation source 720 and the stimulation source 730 are schematically shown on different sides of the sample chamber 710; however, this is for ease of illustration only; in practical implementation the sources may be disposed in any arrangement relative to the sample chamber 710 and each other.

Responsive to application of the first, second, and third pulses of light to the collection of fluorophores in the sample chamber, the fluorophores produce the polarized emissions 712 as discussed above. These emissions 712 are detected by a detector 740. The detector 740 may include one or more photodetectors and associated electronic read-out circuitry that provides an electrical signal representative of the detected polarized emissions 712. The system may optionally include optics 750 configured to relay the polarized emissions 712 to the detector 740. The optics 750 may include one or more mirrors, lenses, or combination thereof, and optionally one or more filters, polarizers, beamsplitters, or other optical components configured to provide the polarized emissions 712 to the detector 740. The output 742 from the detector 740 is provided to a controller 760. The output 742 may be an analog or digital signal, for example, representative of the polarized emissions detected by the detector 740. The controller may include circuitry, optionally including a processor or other computing components, configured to analyze or otherwise manipulate the output 742 from the detector 740 to implement the application for which the system 700 is utilized. For example, the controller 760 may be configured to produce a graph including curves similar to one or more of the curves shown in FIGS. 6B and 6C from which a system user may infer a tumbling rate of the fluorophores. In another example the controller 760 may be configured to produce data corresponding to such a curve or set of curves and to analyze the data to produce an output indicative of an inferred tumbling rate. In another example, the controller 760 may be further configured to analyze the data to calculate an estimated tumbling rate, and based on stored information (such as the correlation between tumbling rates and molecule mass, known properties of the collection of fluorophores 210, and known properties of one or more proteins of interest) and the estimated tumbling rate, produce an output indicative of a degree of protein binding. Given the benefit of this disclosure, those skilled in the art will appreciate that many variations of the above examples may be implemented and that various embodiments of the system 700 can be configured for a variety of different applications based on the principles and techniques disclosed herein.

The above-discussed examples use saturated stimulated emission to extend the mass limit of time-resolved fluorescence anisotropy and provide a useful process by which optical measurements of molecular conditions such as protein binding can be performed. However, other embodiments may achieve this result using other implementations of on-switching/off-switching photophysics. For example, photoactivation can be used to replace excitation (step 420) or in addition to excitation, and photo-deactivation can be used for depletion (steps 430 and 450) or in combination with activation prior to excitation and depletion. Similarly, in FIG. 7, the excitation source 720 can be replaced with or supplemented by another type of photoactivation source, and the stimulation source 730 can be replaced with or supplemented by another type of photodeactivation source. In such cases, the lifetime of the "on" or excited state of the fluorophore may be hours, rather than nanoseconds as in case of fluorescent excitation, and the upper mass limit may be completely eliminated because the fluorescent tag can remain in the excited/on state long enough to allow measurement of even very slow tumbling rates (corresponding to very large molecules).

Figure 8:
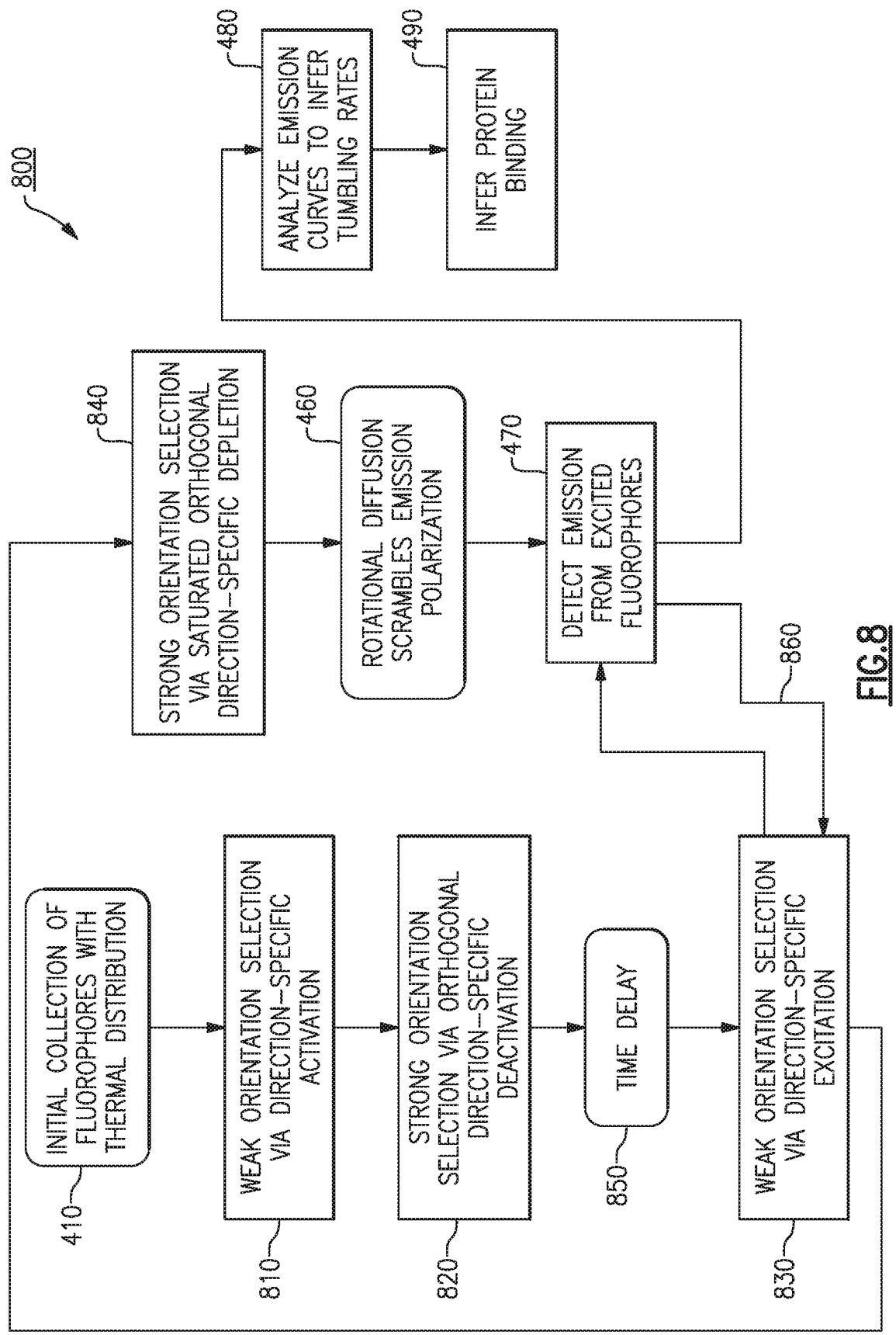
FIG. 8 is a flow diagram of another example of a process of inferring protein binding using fluorescent tags according to certain aspects disclosed herein.

In certain examples, the process of FIG. 4 discussed above may be modified to include steps of photoactivation and deactivation in combination with the excitation and depletion steps. FIG. 8 illustrates an example of a four-pulse scheme according to certain embodiments. In this example, a first pulse of light (the activation pulse) selectively activates those fluorophores having some component of their orientation in the same direction as the polarization of the first pulse of light (step 810), thereby accomplishing weak selection in the first polarization direction (e.g., weak x-selection). A second pulse of light (the deactivation pulse) strongly deactivates activated fluorophores which have some component of their orientation in the same direction as the polarization of the applied second pulse of light (e.g., strong y-deselection). In a step 830, a third pulse of light having the same polarization as the first pulse of light applied in step 810 is applied to excite activated fluorophores having some component of their orientation in the same direction as the polarization of the third pulse of light (e.g., weak x-selection again). The third pulse of light (the excitation pulse) corresponds to the first pulse of light applied in step 420 in the process of FIG. 4. A fourth pulse of light (corresponding to the third pulse of light in the process of FIG. 4) is then applied in step 840 to strongly deplete excited fluorophores having some component of their orientation in the same direction as the polarization of the applied fourth pulse of light (e.g., strong y-deselection). The time delay 850 between the first two pulses (the activation and deactivation pulses) and the second two pulses (the excitation and depletion pulses) may be varied. As shown in FIG. 8 (and as applies equally to the process of FIG. 4), detection of the polarized emissions (step 470) can be performed before and/or after the strong deselection in step 840 (step 450 in the process of FIG. 4). The activation and deactivation pulse pair may be considered as a measurement "pump" and the excitation and depletion pulse pair may be considered as a measurement "probe." In certain example, multiple probe pulse pairs can be applied after the pump pulse pair, as indicated by arrow 860 in FIG. 8. In other examples, multiple excitation pulses (step 830) can be applied and the polarized emissions can be detected (step 470) after one of more of the excitation pulses are applied. Thus, in some examples, the depletion pulse (step 840) may not be necessary and the process 800 can be performed without step 840.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

The invention claimed is:

1. A method of inferring a rate of rotational diffusion of a collection of fluorophores, the method comprising:
   applying a first pulse of light to the collection of fluorophores to excite a plurality of fluorophores in the collection of fluorophores to produce a plurality of excited fluorophores, the first pulse of light having a first polarization and the plurality of excited fluorophores having a component of their orientation aligned with the first polarization;
   applying a second pulse of light to the collection of fluorophores to induce saturated stimulated emission by the plurality of excited fluorophores, the second pulse of light having a second polarization orthogonal to the first polarization;
   applying a third pulse of light to the collection of fluorophores to induce further saturated stimulated emission by the plurality of excited fluorophores, the third pulse of light having the second polarization and being applied after a predetermined time delay following application of the second pulse of light;
   detecting polarized emissions from the plurality of excited fluorophores; and
   inferring the rate of rotational diffusion of the collection of fluorophores based on the detected polarized emissions.

2. The method of claim 1 wherein the first polarization is in the x-direction and the second polarization is in the y-direction.

3. The method of claim 1 wherein detecting the polarized emissions includes receiving the polarized emissions at a photosensitive detector.

4. The method of claim 1 further comprising varying the predetermined time delay between application of the second pulse of light and application of the third pulse of light.

5. A system for measuring rotational diffusion of a collection of fluorophores, the system comprising:
   a sample chamber configured to hold the collection of fluorophores;
   a light source apparatus configured to produce a first pulse of light having a first polarization, a second pulse of light having a second polarization, and a third pulse of light having the second polarization, the first and second polarizations being orthogonal to one another, and the second and third pulses of light being for inducing saturated stimulated emission by the fluorophores and temporally separated from one another by a predetermined time delay, the light source apparatus being further configured to direct the first, second, and third light pulses to the sample chamber;
   a detector configured to receive polarized emissions from the collection of fluorophores, the collection of fluorophores emitting the polarized emissions in response to being illuminated by of the first, second, and third pulses of light, the detector being further configured to provide an output representative of the detected polarized emissions; and
   a controller coupled to the detector and configured to receive the output from the detector and to determine an estimated rate of rotational diffusion of the collection of fluorophores based on the output received from the detector.

6. The system of claim 5 further comprising optics disposed between the sample chamber and the detector and configured to direct the polarized emissions to the detector.

7. The system of claim 5 wherein the light source apparatus includes a first light source configured to produce the first pulse of light and a second light source configured to produce the second and third pulses of light.

8. The system of claim 7 wherein the first pulse of light is x-polarized and the second and third pulses of light are y-polarized.

9. The system of claim 7 wherein the first and second light sources are lasers.

10. The system of claim 5 wherein the controller is further configured to display an indication of the estimated rate of rotational diffusion of the collection of fluorophores.

11. The system of claim 5 wherein the sample chamber is configured to hold a collection of proteins of interest in addition to the collection of fluorophores, and wherein the controller is further configured to infer a degree of protein binding between the collection of proteins and the collection of fluorophores based in part on the estimated rate of rotational diffusion of the collection of fluorophores.

12. The system of claim 5 wherein the individual ones of the collection of fluorophores are bound to corresponding individual ones of a collection of carrier proteins, wherein the sample chamber further holds a collection of proteins of interest, and wherein the controller is further configured to infer a degree of protein binding between the collection of proteins of interest and the collection of carrier proteins based in part on the estimated rate of rotational diffusion of the collection of fluorophores.

13. A method of inferring a rate of rotational diffusion of a collection of fluorophores, the method comprising:
   applying a first pulse of light to the collection of fluorophores to photoactivate a plurality of fluorophores in the collection of fluorophores to produce a plurality of activated fluorophores, the first pulse of light having a first polarization and the plurality of activated fluorophores having a component of their orientation aligned with the first polarization;
   applying a second pulse of light to the collection of fluorophores to deactivate at least some of the plurality of activated fluorophores, the second pulse of light having a second polarization orthogonal to the first polarization;
   applying a third pulse of light to the collection of fluorophores to excite at least some of the plurality of activated fluorophores to produce a plurality of excited fluorophores, the third pulse of light having the first polarization and being applied after a predetermined time delay following application of the second pulse of light;
   detecting polarized emissions from the plurality of excited fluorophores; and
   inferring the rate of rotational diffusion of the collection of fluorophores based on the detected polarized emissions.

14. The method of claim 13 further comprising, after application of the third pulse of light, applying a fourth pulse of light to the collection of fluorophores to stimulate emission by the plurality of excited fluorophores, the fourth pulse of light having the second polarization orthogonal to the first polarization.

15. The method of claim 13 further comprising varying the predetermined time delay.

* * * * *